US007877479B2

(12) United States Patent
Ikada et al.

(10) Patent No.: US 7,877,479 B2
(45) Date of Patent: Jan. 25, 2011

(54) BANDWIDTH CONTROL SYSTEM AND METHOD CAPABLE OF REDUCING TRAFFIC CONGESTION ON CONTENT SERVERS

(75) Inventors: Satoshi Ikada, Tokyo (JP); Yoshitaka Hamaguchi, Tokyo (JP); Nobuyuki Nakamura, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 323 days.

(21) Appl. No.: 12/155,430

(22) Filed: Jun. 4, 2008

(65) Prior Publication Data
US 2008/0304411 A1    Dec. 11, 2008

(30) Foreign Application Priority Data
Jun. 5, 2007    (JP) .............................. 2007-149079

(51) Int. Cl.
    *G06F 15/173* (2006.01)
(52) U.S. Cl. ........................ 709/225; 709/224; 709/223; 709/203
(58) Field of Classification Search ......... 709/223–225, 709/203, 227–228, 226, 235
See application file for complete search history.

(56) References Cited

U.S. PATENT DOCUMENTS

| 6,356,622 | B1 * | 3/2002 | Hassell et al. ............... 379/1.01 |
| 6,857,025 | B1 * | 2/2005 | Maruyama et al. ........... 709/235 |
| 7,155,502 | B1 * | 12/2006 | Galloway et al. ............ 709/223 |
| 2002/0087713 | A1 * | 7/2002 | Cunningham ............... 709/235 |
| 2005/0071766 | A1 * | 3/2005 | Brill et al. .................... 715/738 |
| 2007/0195700 | A1 * | 8/2007 | Katoh et al. ................. 370/235 |

* cited by examiner

*Primary Examiner*—Philip B Tran
(74) *Attorney, Agent, or Firm*—Rabin & Berdo, P.C.

(57) ABSTRACT

A bandwidth control system controls the bandwidths used by plural web crawlers. The bandwidth control system receives a connection request from one of the web crawlers for establishing a connection between that web crawler and a content server. The control system records each of the web crawlers in association with a content server to which that web crawler is connected. The control system monitors the traffic on the content servers to which the web crawlers are connected. When the traffic on the content server recorded becomes too heavy, the control system disconnects the web crawler from the content server to which the crawler is connected.

26 Claims, 12 Drawing Sheets

FIG. 2

<PRIOR DISCONNECTION LIST 142>

| TERMINAL |
|---|
| CRAWLER A |
| TERMINAL B |

FIG. 3

<ALLOCATED BANDWIDTH DATA 143>

| TERMINAL | DESTINATION | ALLOCATED BANDWIDTH | COMMUNICATION ROUTE |
|---|---|---|---|
| CRAWLER A | CONTENT SERVER A | 2Mbps | ROUTER A, ROUTER B, ··· |
| AGENT A | CONTENT SERVER B | 2Mbps | ROUTER C, ROUTER D, ··· |
| AGENT B | CONTENT SERVER C | 3Mbps | ROUTER E, ROUTER F, ··· | ated via a search engine results page. In another

BANDWIDTH CONTROL SYSTEM AND METHOD CAPABLE OF REDUCING TRAFFIC CONGESTION ON CONTENT SERVERS

BACKGROUND OF THE INVENTION

1. Field of the Invention

The present invention relates generally to a bandwidth control system and a method therefor capable of reducing traffic congestion on content servers, and more particularly to a method for controlling network traffic, a method and a device for content-crawling capable of reducing traffic congestion on content servers.

2. Description of the Background Art

Accessibility to great volumes of web information, i.e. information described in mark-up languages such as HTML (HyperText Markup Language), becomes possible through the World Wide Web, i.e. the Internet, because of the development of information technology and the popularity of information communication equipment.

However, in contrast with the huge amount of information, it becomes difficult to search for necessary information. A number of search engines are available on the Internet. These search engines include not only general-purpose ones but also specialized ones for use in searching for information in particular fields such as job information.

When a search engine is implemented, it is necessary to build a crawler that automatically accesses the Web and collects documents therefrom, a morphologic analyzer that performs morphologic analysis of a specific language, such as Japanese, and so forth, an index generator that generates indices for enabling retrieval of necessary information from documents as collected, and other units for performing other necessary processes.

In this connection, U.S. patent application publication No. US 2005/0071766 A1 to Brill et al., discloses systems and methods for obtaining information from a networked system utilizing a distributed web crawler. The distributed nature of clients of a server is leveraged to provide fast and accurate web crawling data. Information collected by a server's web crawler is compared to data retrieved by clients of the server to update the crawler's data. In one instance of this prior art technique, data comparison is achieved by utilizing information disseminated via a search engine results page. In another instance of this prior art technique, data validation is accomplished by client dictionaries, emanating from a server, which summarize web crawler data. This prior art technique also facilitates data analysis by providing means to resist spoofing of a web crawler to increase data accuracy.

A web crawler or spider is a program that accesses the Web in a methodical, automated manner, and collects content.

In the case of the prior art technique as described in Brill et al., the web crawler continues accessing the server from which content is collected until the collection of content is completed, and accesses with several and parallel connection on the same time, so that a certain amount of the bandwidth of the network is consumed.

However, if the network bandwidth is consumed by the crawler process, the network bandwidth available for providing the service of the server may become deficient. Particularly, for well-trafficked servers, it may substantially affect the quality of service if the available network bandwidth becomes deficient. The crawling process has therefore not to cause communication delay or congestion.

Because of this, there is desired a network communications traffic control method which can reduce the consumption of the network bandwidth.

SUMMARY OF THE INVENTION

It is an object of the present invention to provide a network bandwidth controlling method, a crawling method, an agent device, a bandwidth control system, a program product for implementing the methods, device and system in which it is possible to reduce the traffic on content servers.

In accordance with the present invention, a method of controlling a network bandwidth used by a communication terminal comprises: a connection request sending step of sending a connection request for connection with a destination from the communication terminal, the connection request including information that, when there is a shortage of network bandwidth, the connection between the communication terminal and the destination can be disconnected by priority; a connection request receiving step of receiving the connection request between the communication terminal and the destination by a network bandwidth control system; a connection establishing step of establishing a connection between the communication terminal and the destination by the network bandwidth control system; and a disconnecting step of disconnecting the connection between the communication terminal and the destination by the network bandwidth control system when there is a shortage of network bandwidth.

Thus, in accordance with the present invention, the connection between a web crawler and a content server is disconnected, when the traffic on this content server becomes heavier, or too heavy.

Accordingly, it is possible to perform the crawling process when the bandwidth available for communication with the content server has room for the crawling process, and thereby avoid degrading the quality of service on the content server or network for other terminals even when the available network bandwidth becomes deficient.

BRIEF DESCRIPTION OF THE DRAWINGS

The objects and features of the present invention will become more apparent from consideration of the following detailed description taken in conjunction with the accompanying drawings in which, FIG. 1 schematically shows the configuration of a network system in accordance with an embodiment of the present invention;

FIG. 2 explanatorily shows an example of a prior disconnection list in accordance with the embodiment shown in FIG. 1;

FIG. 3 explanatorily shows an example of an allocated bandwidth data in accordance with the embodiment;

DESCRIPTION OF THE PREFERRED EMBODIMENTS

Figure 1:
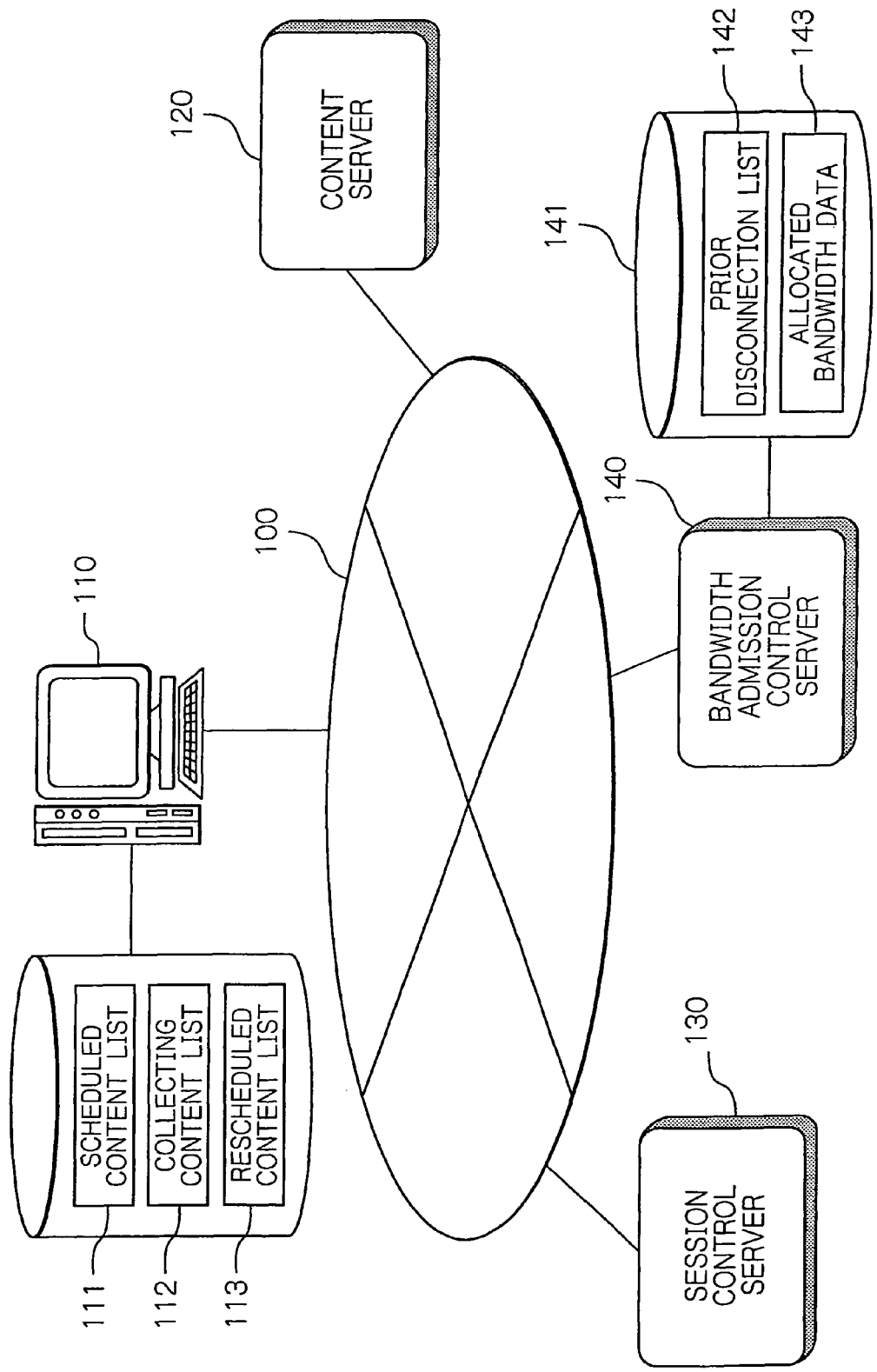

With reference to FIG. 1, a network system in accordance with an embodiment of the present invention includes a telecommunications network, such as IP (Internet Protocol) network, 100, a crawling terminal 110, a content server 120, a session control server 130, and a bandwidth admission control server 140, which are interconnected as illustrated.

In FIG. 1, only one crawling terminal 110 is illustrated, and will be described in the following as a terminal of which bandwidth usage is controlled in accordance with the present invention. However, this is only for the sake of clarity in description, but there are a plurality of similar crawling terminals and any other terminals of which bandwidth usages can be controlled in accordance with the present invention and which serve to collect information from the network 100.

The crawling terminal 110, the content server 120, the session control server 130 and the bandwidth admission control server 140 are connected to each other by the network 100.

The crawling terminal 110 is adapted to perform crawling, i.e. serve to collect content which is distributed, or delivered, by the content server 120. The crawling terminal 110 performs crawling in response to the instruction of a user or in accordance with a predetermined schedule.

The crawling terminal 110 is provided with a storage unit, or circuit, in which are stored data of a scheduled content list 111, a collecting content list 112, and a rescheduled content list 113.

The scheduled content list 111 is used to list content items to be collected by the crawling terminal 110. The list of content items is described, for example, by the address, such as URI (Uniform Resource Identifier) or URL (Uniform Resource Locator), of each content item.

The collecting content list 112 is adapted to list content items which are being collected by the crawling terminal 110. The collecting content list 112 is described in the same manner as the scheduled content list 111.

The rescheduled content list 113 is for use in listing content items which the crawling terminal 110 failed to collect. The rescheduled content list 113 is described in the same manner as the scheduled content list 111. The purposes of these lists will be described later with reference to FIG. 7.

The content server 120 functions as providing a content delivery service. The session control server 130 serves to mediate a connection between the crawling terminal 110 and another server or the like over the network 100. In the following, the operation of the session control server 130 will be described in the case where the crawling terminal 110 connects with the content server 120. However, any other connection process can be performed through the session control server 130 in the same manner.

After a communication terminal on the network 100 sends a connection request to the session control server 130 for establishing connection, the bandwidth admission control server 140 manages the bandwidth as used by allocating a necessary bandwidth to the communication terminal and releasing the allocated bandwidth by terminating connection and so forth. The bandwidth admission control server 140 is provided with the functionality of monitoring the traffic on the content server 120. For example, the bandwidth admission control server 140 can monitor the traffic by receiving a message from the content server indicative of a heavy traffic load.

The bandwidth control admission server 140 is provided with an allocated bandwidth storage unit 141. The allocated bandwidth storage unit 141 stores a prior disconnection list 142, and allocated bandwidth data 143. The prior disconnection list 142 and the allocated bandwidth data 143 will be described later with reference to FIGS. 2 and 3 respectively.

In order to make it easy to understand the present invention, the operation of an ordinary web crawler will be described. A web crawler is implemented by a program sequence to collect Web contents instead of hands. This program automatically downloads content while crawling around the Internet by extracting hyperlinks on each Web content to discover an URL (Uniform Resource Locator) for the next download. The collection of data from Web contents is performed by repeating this process.

The web crawler is referred to also as a web robot or a web spider, and sometimes performs indexing or updating data.

Figure 12:
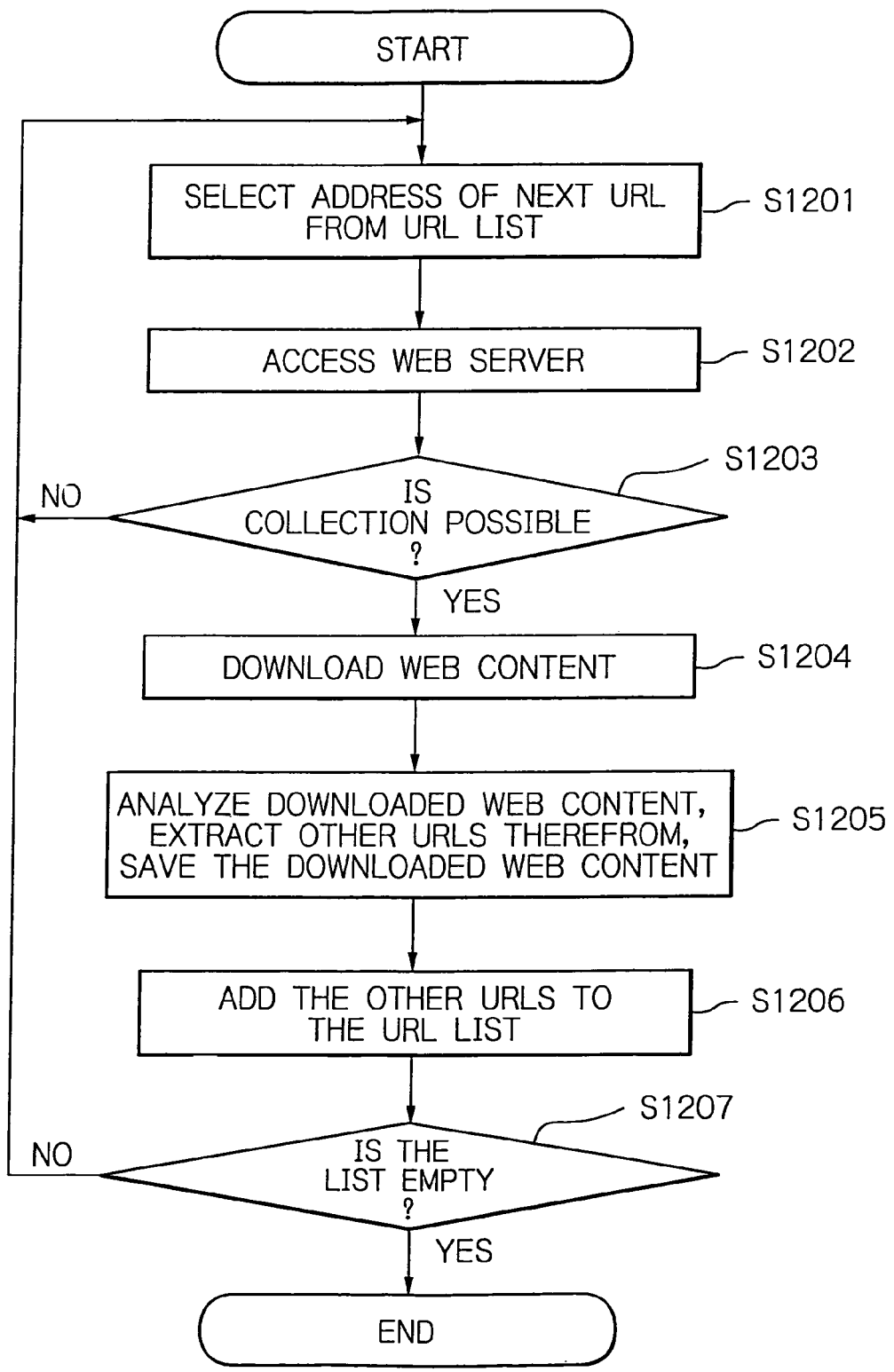
FIG. 12 is a flow chart useful for understanding the operation of a conventional web crawler.

FIG. 12 explanatorily will be referred to in order to understanding the operation of a conventional web crawler. At first, in step S1201, a URL from which content is to be collected next is selected from among a URL list.

In step S1202, the web crawler accesses a web server in accordance with the URL which is selected in step S1201.

In step S1203, it is determined whether or not content can be collected from the URL which is selected in step S1201. If content can be collected, the process proceeds to step S1204, or otherwise the process returns to step S1201 in which another URL is selected. It is noted that the case where content cannot be collected refers to, for example, a case where the content is not provided, where access restriction is imposed on the content, or the like case.

In step S1204, the web crawler downloads a Web content from the URL which is accessed.

In step S1205, the web crawler analyzes the data (e.g. HTML text) of the downloaded Web content, extracts URLs contained in the data, and saves the downloaded Web content. The saved Web content is processed by an indexing process for use in a search engine. The URLs contained in the Web content are usually described as hyperlinks, but not limited thereto.

In step S1206, the web crawler adds the URLs extracted in step S1205 to the URL list.

In step S1207, when crawling is continued, the process returns to step S1201 in which another URL is selected.

The crawling process is repeated in this manner by extracting URLs from each downloaded Web content to expand the crawling range.

Figure 13:
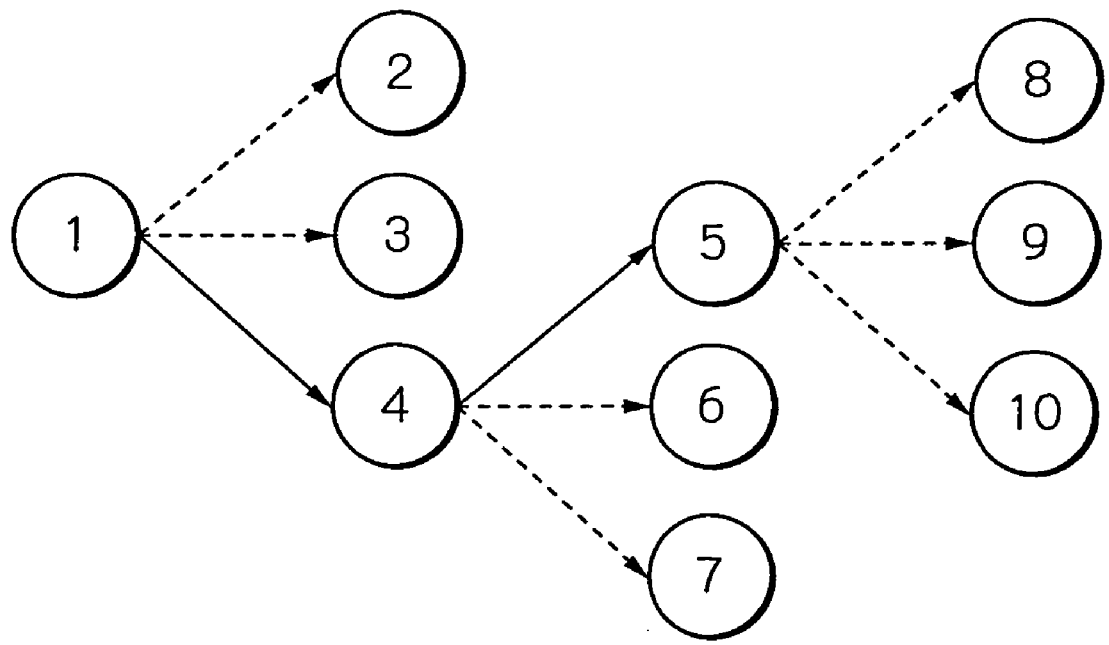
FIG. 13 schematically shows the crawling process of a conventional web crawler.

Now, reference will be made to FIG. 13 schematically showing the crawling process. As described with reference to FIG. 12, the crawling process is expanded by following the URLs contained in each downloaded Web content. In the case shown in FIG. 13, the Web content on the website 1, downloaded first, includes links to other websites 2, 3 and 4, and the Web content on the website 4 includes links to other websites 5, 6 and 7.

Also, when successively following the hyperlinks from a starting Web page, the breadth-first search algorithm can be used while limiting the depth level. For example, referring again to FIG. 13, the Web contents on the websites 2, 3 and 4 can be collected when the depth level is set to "1", and the Web contents on the websites 5, 6 and 7 can be collected when the depth level is set to "2".

The above description is directed to the conventional crawling technique. Returning to the description of the present embodiment, the prior disconnection list 142 and the allocated bandwidth data 143 will be described in advance of specifically describing the operation.

FIG. 2 explanatorily shows an example of the prior disconnection list 142. The prior disconnection list 142 contains the list of communication terminals which can be disconnected with priority when there is a shortage of network bandwidth. This list contains information for identifying communication terminals such as the addresses of the respective communication terminals.

The format of the prior disconnection list 142 may be selected from among appropriate file formats such as a table, a CSV (Comma Separated Values) format or the like which can be used for the prior disconnection list 142. The timing of setting a value to the prior disconnection list 142 will be described later with reference to FIG. 5.

FIG. 3 explanatorily shows an example of the allocated bandwidth data 143. The allocated bandwidth data 143 contains fields named "terminal", "destination", "allocated communication bandwidth" and "communication route".

The terminal field is used to store, or record, information for identifying the respective communication terminals managed by the bandwidth admission control server 140, such as the address of each communication terminal or the like.

The destination field is used to store information for identifying the destination server of each communication terminal listed in the terminal field, such as the addresses of the corresponding destination server or the like. In the figure, the names of communication terminals and destination servers are described merely for the sake of clarity in illustration. Meanwhile, in the case of the configuration shown in FIG. 1, the address of the content server 120 is input to the destination field.

The allocated communication bandwidth field is used to store the value of the bandwidth which can be used for communication between the communication terminal specified by the terminal field and the destination server specified by the destination field. Namely, the bandwidth admission control server 140 can manage the bandwidth used by each communication terminal with reference to the allocated communication bandwidth field.

The information about the bandwidth used by each communication terminal may be generated in the bandwidth admission control server 140 in accordance with a prescribed scheme and transmitted to that specific communication terminal, or transmitted from that communication terminal to the bandwidth admission control server 140.

The communication route field is used to store information about the communication route which is used for communication between a communication terminal specified by the terminal field and the corresponding destination server specified by the destination field.

Figure 4:
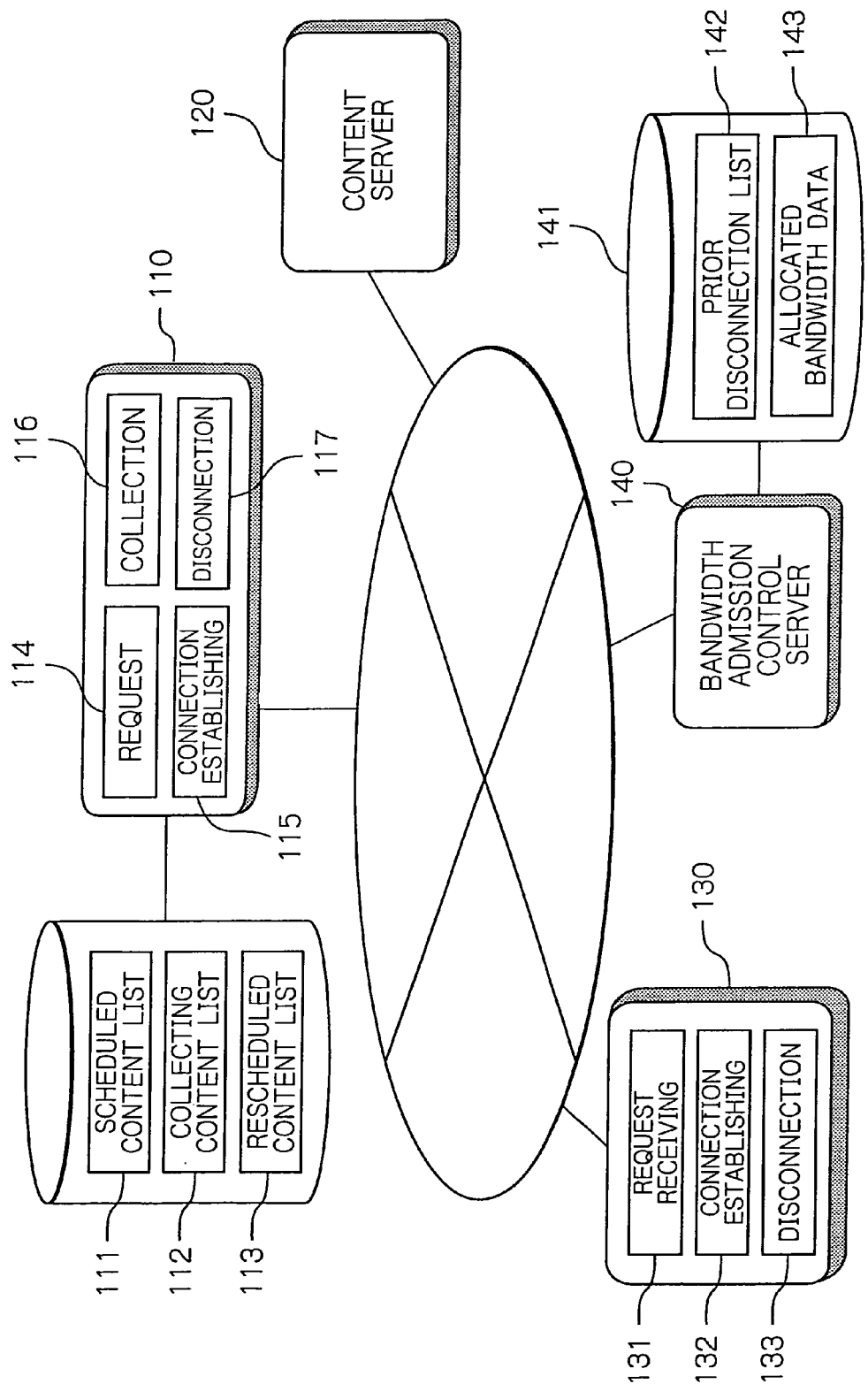
FIG. 4 schematically shows the configuration of a crawling terminal and a session control server in accordance with the embodiment.

FIG. 4 schematically shows the configuration of the crawling terminal 110 and the session control server 130. FIG. 4 is drawn with what is shown in FIG. 1 incorporated.

The crawling terminal 110 includes a request subsection 114, a collection subsection 116, a connection establishing subsection 115 and a disconnection subsection 117. The request subsection 114 serves to issue a request for a connection with a destination over the network 100. In the case of the present embodiment, the request subsection, or circuit, 114 issues a request for a connection with the content server 120. The connection establishing subsection 115 functions as establishing a network connection with the destination. The collection subsection 116 collects content from the content server 120. The disconnection subsection 117 functions as disconnecting the network connection which is established by the connection establishing subsection 115.

The request subsection 114, the collection subsection 116, the connection establishing subsection 115 and the disconnection subsection 117 are implemented with an interface for connection with the network 100, a control circuit for controlling the communication procedure, a processor such as a CPU (Central Processor Unit) or a microcomputer, necessary firmware and software, and so forth.

The session control server 130 includes a request receiving subsection 131, a connection establishing subsection 132 and a disconnection subsection 133. The request receiving subsection 131 is adapted to receive a connection request to the content server 120 from the crawling terminal 110. The connection establishing subsection 132 serves as an intermediary to establish a connection between the crawling terminal 110 and the content server 120 on the basis of the connection request received by the request receiving subsection 131. The disconnection subsection 133 functions as issuing a command to disconnect an established connection. The communication terminal receiving this command disconnects the connection which has been established at this time. The detailed operation of the session control server 130 will be described later with reference to FIG. 5.

The request receiving subsection 131, the connection establishing subsection 132 and the disconnection subsection 133 are implemented with an interface for connection with the network 100, a control circuit for controlling the communication procedure, a processor such as a CPU or a microcomputer, necessary firmware and software, and so forth.

In what follows, the crawling process performed by the crawling terminal 110 will be described in the case where content is collected from the content server 120. Meanwhile, when the crawling terminal 110 connects with the content server 120, the session control server 130 serves as an intermediary to establish a connection therebetween, and therefore the process of controlling the connection establishment will be described first with reference to FIGS. 5 and 6, followed by describing the crawling process.

Figure 5:
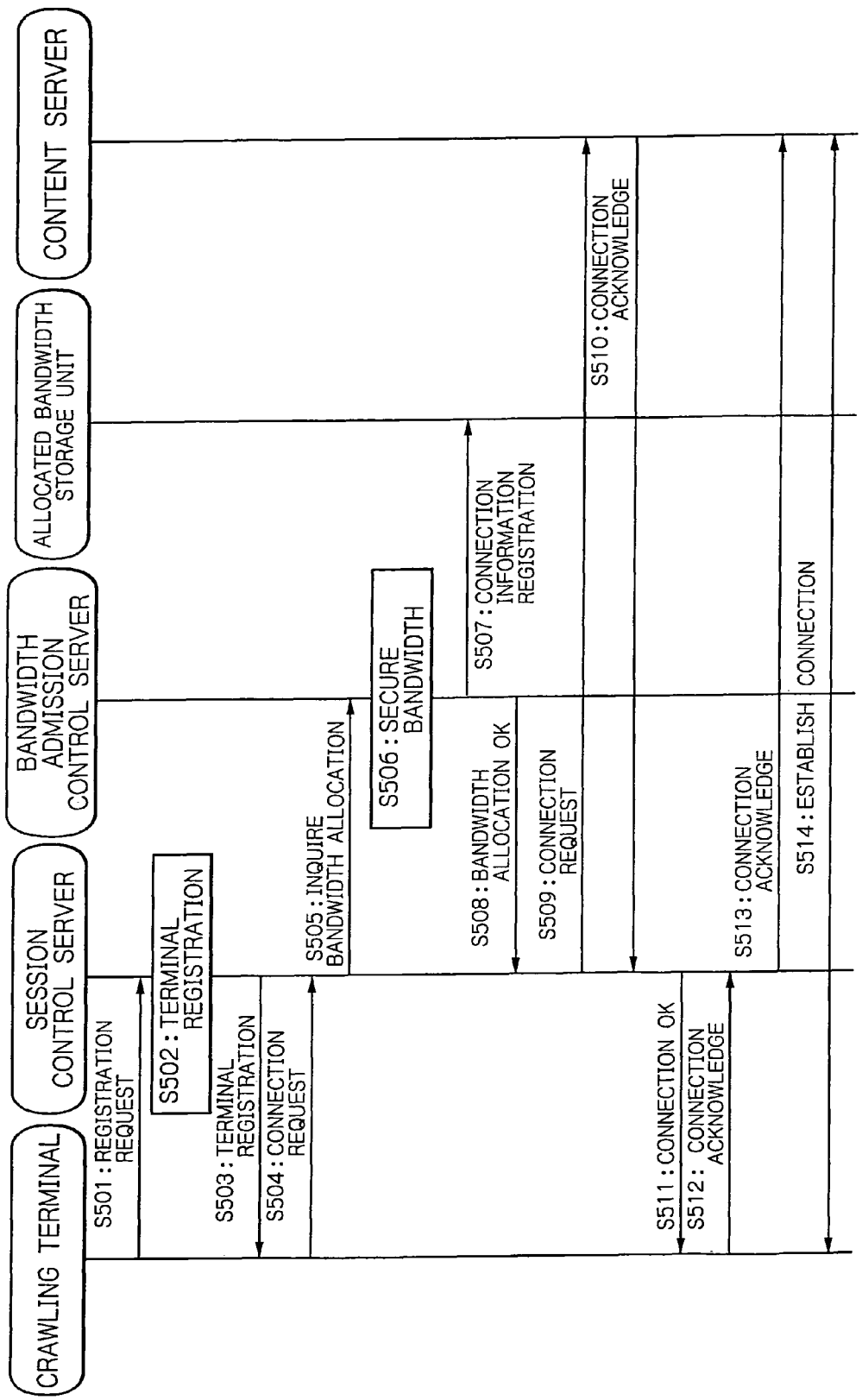
FIG. 5 explanatorily shows the sequence of mediating between the crawling terminal and the content server by the session control server for establishing connection therebetween in accordance with the embodiment.

FIG. 5 explanatorily shows the sequence of mediating between the crawling terminal 110 and the content server 120 by the session control server 130 for establishing connection therebetween. In the following, the procedural steps of the process will be described.

In step S501, the request subsection 114 of the crawling terminal 110 sends a registration request to the session control server 130 for registering the crawling terminal 110. This step corresponds to the "REGISTER" message of SIP (Session Initiation Protocol).

In step S502, the request receiving subsection 131 of the session control server 130 accepts the registration request, and registers the crawling terminal 110 to be controlled.

In step S503, after completing the registration, the request receiving subsection 131 returns a registration completion message to the crawling terminal 110.

In step S504, the request subsection 114 of the crawling terminal 110 sends a connection request to the session control server 130 for connection with the content server 120. This step corresponds to the "INVITE" message of SIP.

In this case, the connection request packet includes a flag indicative that, when there is a shortage of network bandwidth, the connection between the crawling terminal 110 and the content server 120 can be disconnected by priority.

In step S505, the request receiving subsection 131 of the session control server 130 accepts the connection request, and inquires of the bandwidth admission control server 140 as to whether or not it is possible to reserve a sufficient bandwidth necessary for connection with the content server 120.

Also, in the same manner as in step S504, the query packet includes a flag indicative that, when there is a shortage of network bandwidth, the connection between the crawling terminal 110 and the content server 120 can be disconnected by priority.

In step S506, the bandwidth admission control server 140 investigates the network equipment on the communication route such as routers to determine whether or not it is possible to reserve a sufficient bandwidth necessary for the crawling terminal 110 to connect with the content server 120.

If a sufficient bandwidth can be reserved, the bandwidth admission control server 140 reserves, from the bandwidth available in the current network 100, a sufficient bandwidth necessary for the crawling terminal 110 to connect with the content server 120.

In step S507, the bandwidth admission control server 140 records the bandwidth reserved in step S506 in the allocated bandwidth data 143. The record includes information that "the terminal is the crawling terminal 110" and "the destination is the content server 120".

In step S508, the bandwidth admission control server 140 returns to the session control server 130 a response indicating that the necessary network bandwidth has been reserved. Since the connection request includes a flag indicative that, when there is a shortage of network bandwidth, the connection can be disconnected by priority, the bandwidth admission control server 140 saves the address or the like of the crawling terminal 110 in the prior disconnection list 142.

In step S509, after the request receiving subsection 131 of the session control server 130 receives the response indicating that the necessary network bandwidth has been reserved, the connection establishing subsection 132 sends the connection request received from the crawling terminal 110 to the content server 120. This step corresponds to the "INVITE" message of SIP.

In step S510, when accepting the connection request from the crawling terminal 110, the content server 120 returns to the session control server 130 a response indicating that it accepts the connection request. This step corresponds to the "200 OK" message of SIP.

In step S511, the connection establishing subsection 132 of the session control server 130 receives the response indicating that the content server 120 accepts the connection request from the crawling terminal 110.

Next, the connection establishing subsection 132 returns the response to the crawling terminal 110.

In step S512, after the request subsection 114 of the crawling terminal 110 receives the response indicating that the content server 120 accepts the connection request from the crawling terminal 110, if it is possible to connect with the content server 120, the connection establishing subsection 115 of the crawling terminal 110 sends to the session control server 130 a message that the crawling terminal 110 can connect with the content server 120. This step corresponds to the "ACK" message of SIP.

In step S513, the connection establishing subsection 132 of the session control server 130 sends to the content server 120 a message that the crawling terminal 110 can connect with the content server 120.

In step S514, a connection is established between the crawling terminal 110 and the content server 120. Thereafter, the collection subsection 116 of the crawling terminal 110 collects the content of the content server 120.

Figure 6:
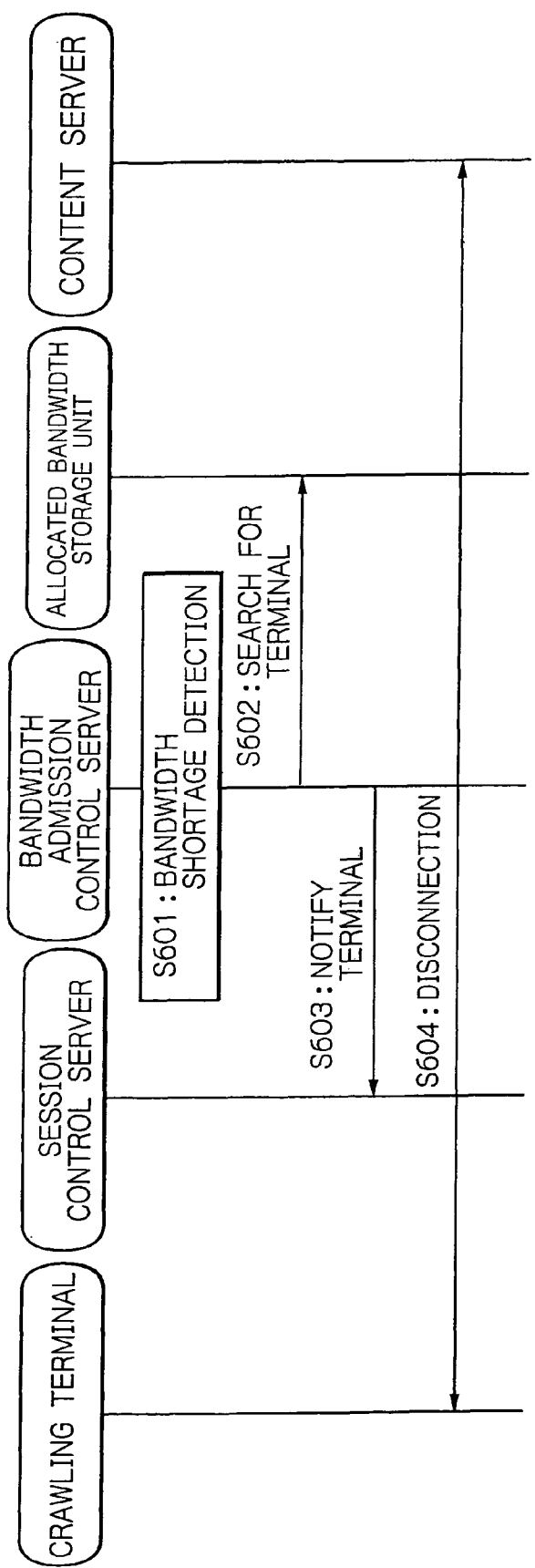
FIG. 6 explanatorily shows the sequence that, when there is a shortage of network bandwidth, the crawling terminal is disconnected from the content server in accordance with the embodiment.

FIG. 6 explanatorily shows the sequence that, when there is a shortage of network bandwidth, the connection between the crawling terminal 110 and the content server 120 is disconnected. In the following, the steps of the process will be described.

In step S601, it is assumed that there is a shortage of network bandwidth on the communication route on which the crawling terminal 110 has established a connection with the content server 120 because another communication terminal establishes a new connection with the content server 120 and so forth, and that the bandwidth admission control server 140 detects this shortage of network bandwidth.

In step S602, the bandwidth admission control server 140 searches the prior disconnection list 142 for an appropriate terminal which can be disconnected to reserve a necessary network bandwidth. Searching is performed with reference to the allocated bandwidth data 143 from which necessary values such as the values of allocated communication bandwidths are extracted.

In step S603, the bandwidth admission control server 140 notifies the session control server 130 of the terminal which is selected in step S602.

In step S604, the disconnection subsection 133 of the session control server 130 receives the notification from the bandwidth admission control server 140, and sends to the crawling terminal 110 and the content server 120 a message indicating that the connection therebetween is to be disconnected. This step corresponds to the "BYE" message of SIP.

The disconnection subsection 117 of the crawling terminal 110 disconnects the connection with the content server 120.

As has been discussed above, the session control server 130 serves to control the connection establishing process and the connection disconnection process.

Next, the crawling process performed by the crawling terminal 110 for collecting content of the content server 120 will be described with reference to FIG. 7. It is to be noted that the procedures of establishing and disconnecting a connection may be the same as described above with reference to FIGS. 5 and 6, and therefore no redundant description is repeated.

Figure 7:
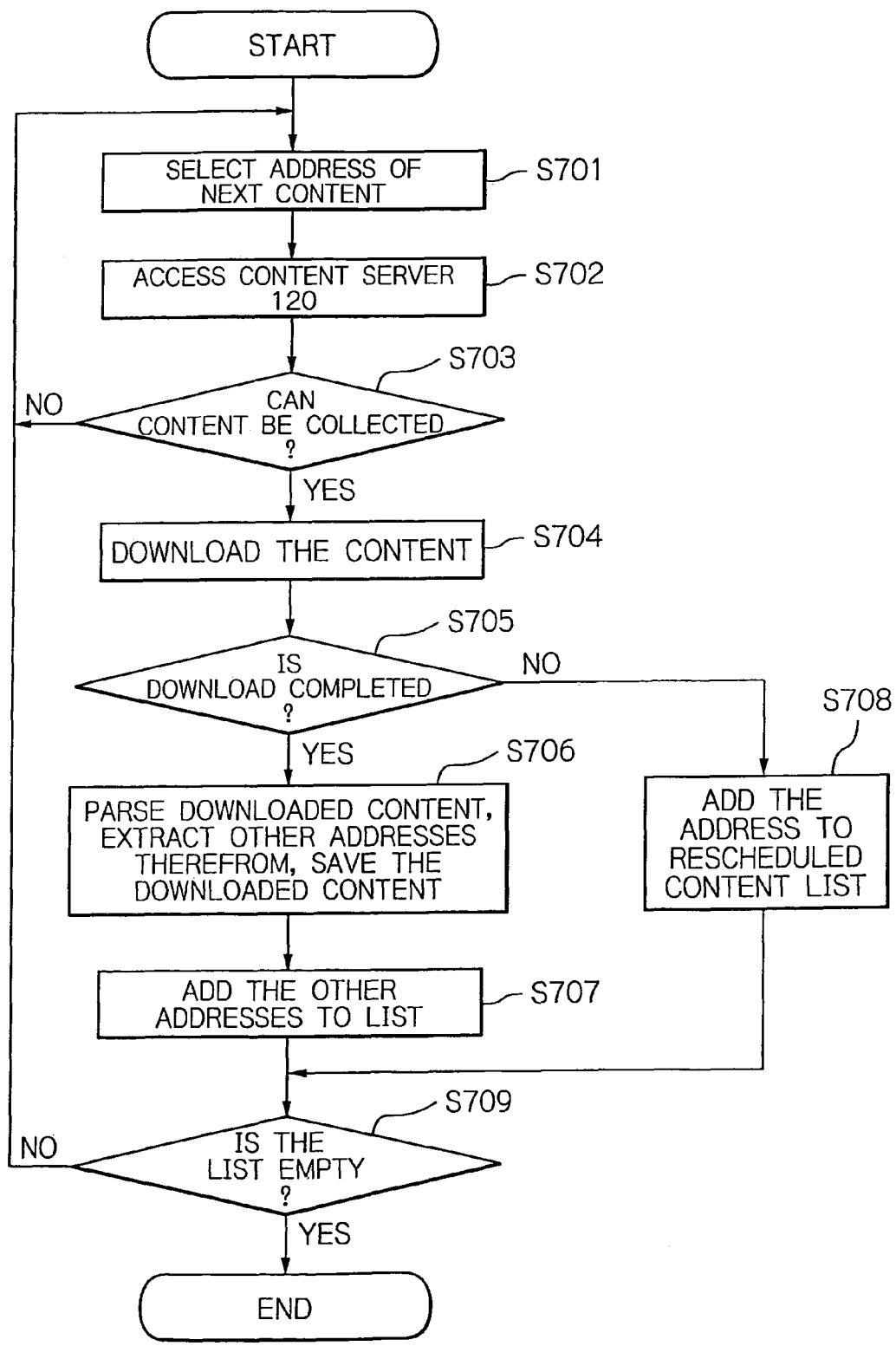
FIG. 7 is a flow chart useful for understanding the crawling process performed by the crawling terminal for collecting content of the content server in accordance with the embodiment.

FIG. 7 is a flow chart useful for understanding the crawling process performed by the crawling terminal 110 for collecting content of the content server 120. In the following, the steps of the process will be described. It is assumed that a connection has been established between the crawling terminal 110 and the content server 120.

In step S701, the collection subsection 116 of the crawling terminal 110 selects the address of the content to be collected with reference to the scheduled content list 111. The address as selected is then removed from the scheduled content list 111 and added to the collecting content list 112.

In step S702, the collection subsection 116 accesses the content server 120 on the basis of the address selected in step S701.

In step S703, the collection subsection 116 determines whether or not the content can be collected from the address selected in step S701. If the content can be collected, the process proceeds to step S704, or otherwise the process returns to step S701 in which another address is selected.

In step S704, the collection subsection 116 downloads content from the address which is accessed.

In step S705, the collection subsection 116 determines whether or not the content has been completely downloaded in step S704. If the download is completed, the process proceeds to step S706, otherwise proceeds to step S708.

It is noted that the download is not completed when the bandwidth admission control server 140 detects a shortage of, network bandwidth, and disconnects the connection between the crawling terminal 110 and the content server 120 in accordance with the procedure described with reference to FIG. 6.

In step S706, the collection subsection 116 deletes the address of the content which is completely downloaded from the collecting content list 112, parses the downloaded content, extracts other addresses contained in the downloaded content, and saves the downloaded content. The content as saved is processed by an indexing process for use in a search engine.

In step S707, the collection subsection 116 adds other addresses extracted in step S706 to the scheduled content list 111.

In step S708, the collection subsection 116 adds the address of the content which has not be completely downloaded to the rescheduled content list 113, and deletes this address from the collecting content list 112.

In step S709, if the scheduled content list 111 contains an address from which content has not collected yet, and the crawling process is continued, the process returns to step S701 in which the address is selected. If there is an address in the rescheduled content list 113, this address is accessed to try to collect content therefrom again.

That is to say, even if the connection is disconnected while the collection subsection 116 is downloading content, it is possible to collect the content again by writing the address of this content to the rescheduled content list 113 and downloading the content later when connected again.

In the case of the present embodiment, the session control server 130 and the bandwidth admission control server 140 are provided as separate server machines from each other. However, both servers can be implemented in a single machine. In such a case, the single machine may include the request receiving subsection 131, the connection establishing subsection 132, the disconnection subsection 133 and the allocated bandwidth storage unit 141.

Also, the request subsection 114, the connection establishing subsection 115, the collection subsection 116 and the disconnection subsection 117 of the crawling terminal 110 are structured into separate units in the above. However, some or all of these units may be implemented into one unit. The above alternative implementation may be also the case with the request receiving subsection 131, the connection establishing subsection 132 and the disconnection subsection 133 of the session control server 130.

Furthermore, while the scheduled content list 111, the collecting content list 112 and the rescheduled content list 113 are structured as separate lists from each other, some or all of these lists may be combined into a single list.

The session control server 130 and the bandwidth admission control server 140 serves as a "network bandwidth control system" in combination. In the case where the session control server 130 and the bandwidth admission control server 140 are implemented as separate servers, the disconnection subsection 133 and the bandwidth admission control server 140 may serve as a "disconnection system" in combination.

As has been discussed above, the crawling terminal 110 of the present embodiment sends a request for connection with the content server 120 together with the information that, when there is a shortage of network bandwidth, the connection between the crawling terminal 110 and the content server 120 can be disconnected by priority. The connection therebetween can be disconnected when network congestion occurs.

Accordingly, when the content server 120 is a streaming media content provider for video or audio content or the like server which is providing content while securing a certain bandwidth, there is an advantage that the crawling terminal 110 is prevented from continuously occupying a network bandwidth for a substantial time.

From another viewpoint, since collection of content becomes timely inefficient when there is heavy traffic on the communication line, it is possible to effectively collect content by avoiding such heavy traffic.

Figure 8:
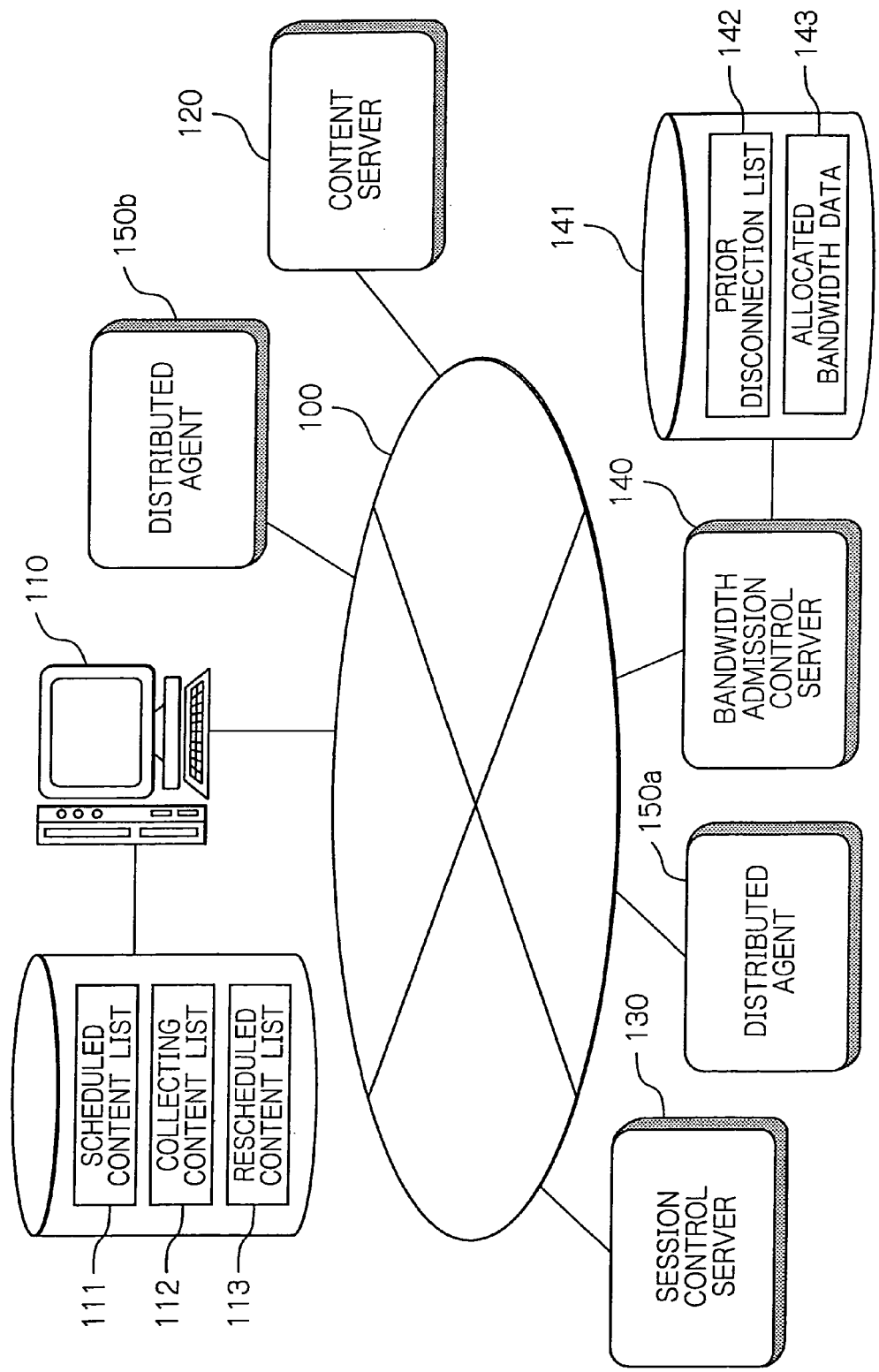
FIG. 8 schematically shows, like FIG. 1, the configuration of a network system in accordance with an alternative embodiment of the present invention.

Now, reference will be made to FIG. 8, schematically showing the configuration of a network system in accordance with an alternative embodiment of the present invention. In the figure, there are distributed agents 150*a* and 150*b* in addition to the components as illustrated in FIG. 1. Also, as described below with reference to FIG. 9, the crawling terminal 110 further includes a recollection request subsection 118. Of course, like components are designated with the same reference numerals.

The distributed agents 150*a* and 150*b* are connected to the network 100. The remaining components shown in FIG. 8 are functionally equivalent to those shown in FIG. 1, and therefore no redundant description is repeated.

The distributed agents 150*a* and 150*b* are adapted for serving to collect content from the content server 120 in the same manner as the crawling terminal 110. For connecting with the content server 120, the distributed agents 150*a* and 150*b* sends a connection request to the session control server 130. The subsequent process may be the same as described in FIGS. 5 and 6. While only two distributed agents are included in the illustrative embodiment, an arbitrary number of such distributed agents may be used.

Figure 9:
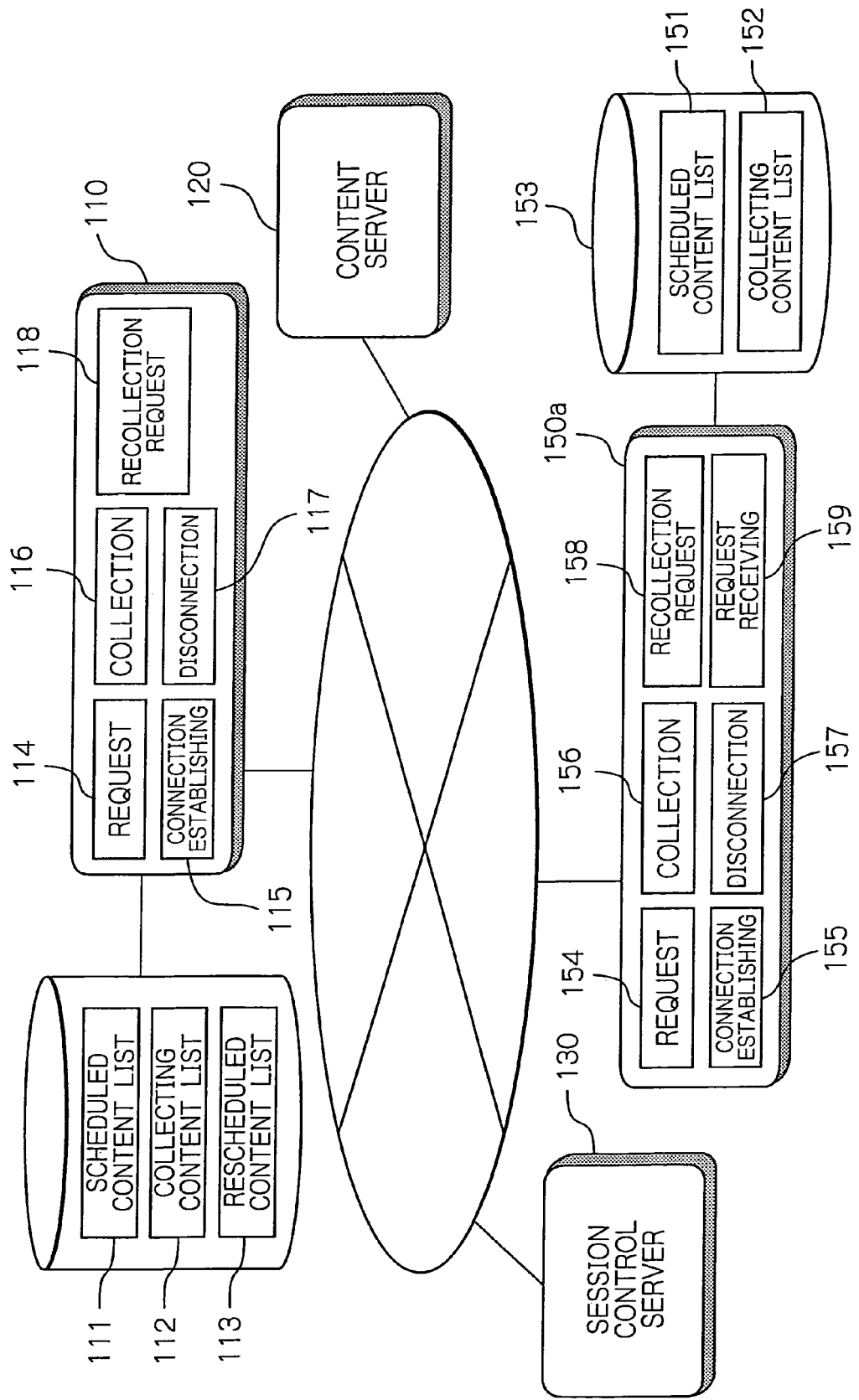
FIG. 9 schematically shows, like FIG. 4, the configuration of the crawling terminal and a distributed agent in accordance with the alternative embodiment shown in FIG. 8.

FIG. 9 schematically shows the configuration of the crawling terminal 110 and the distributed agent 150*a*. The figure is drawn to incorporate the configuration into what is illustrated in FIG. 8 with the bandwidth admission control server 140 and the distributed agent 150*b* omitted therefrom for the sake of clarity in illustration.

The recollection request subsection 118 of the crawling terminal 110 serves to request the distributed agent 150*a* or 150*b* to collect content items recorded in the rescheduled content list 113. The detailed operation will be made later with reference to FIG. 10. The recollection request subsection 118 of the crawling terminal 110 is implemented with an interface for connection with the network 100, a control circuit for controlling the communication procedure, a processor such as a CPU or a microcomputer, necessary firmware and software, and so forth. In the case of the present alternative embodiment, the crawling terminal 110 does not perform recollection of content items recorded in the rescheduled content list 113 by itself, unlike the embodiment shown in and described with reference to FIG. 4.

The distributed agent 150a includes a request subsection 154, a collection subsection 156, a connection establishing subsection 155, a disconnection subsection 157, a recollection request subsection 158 and a request receiving subsection 159. Also, the distributed agent 150a is provided further with a storage unit 153 in which stored are data of a scheduled content list 151 and a collecting content list 152, in the same manner as the crawling terminal 110. It is noted that other distributed agents such as the distributed agent 150b, may have the configuration equivalent to the agent 150a.

The scheduled content list 151, the collecting content list 152, the request subsection 154, the collection subsection 156, the connection establishing subsection 155 and the disconnection subsection 157 have the same functions as the corresponding components of the crawling terminal 110. When the distributed agent 150a fails to collect content from the content server 120, the recollection request subsection 158 sends a recollection request to another distributed agent, for example, the distributed agent 150b, for recollecting the content. The request receiving subsection 159 receives a recollection request from the crawling terminal 110 or another distributed agent such as the distributed agent 150b.

The recollection request subsection 158 and the request receiving subsection 159 are implemented with an interface for connection with the network 100, a control circuit for controlling the communication procedure, a processor such as a CPU or a microcomputer, necessary firmware and software, and so forth.

Figure 10:
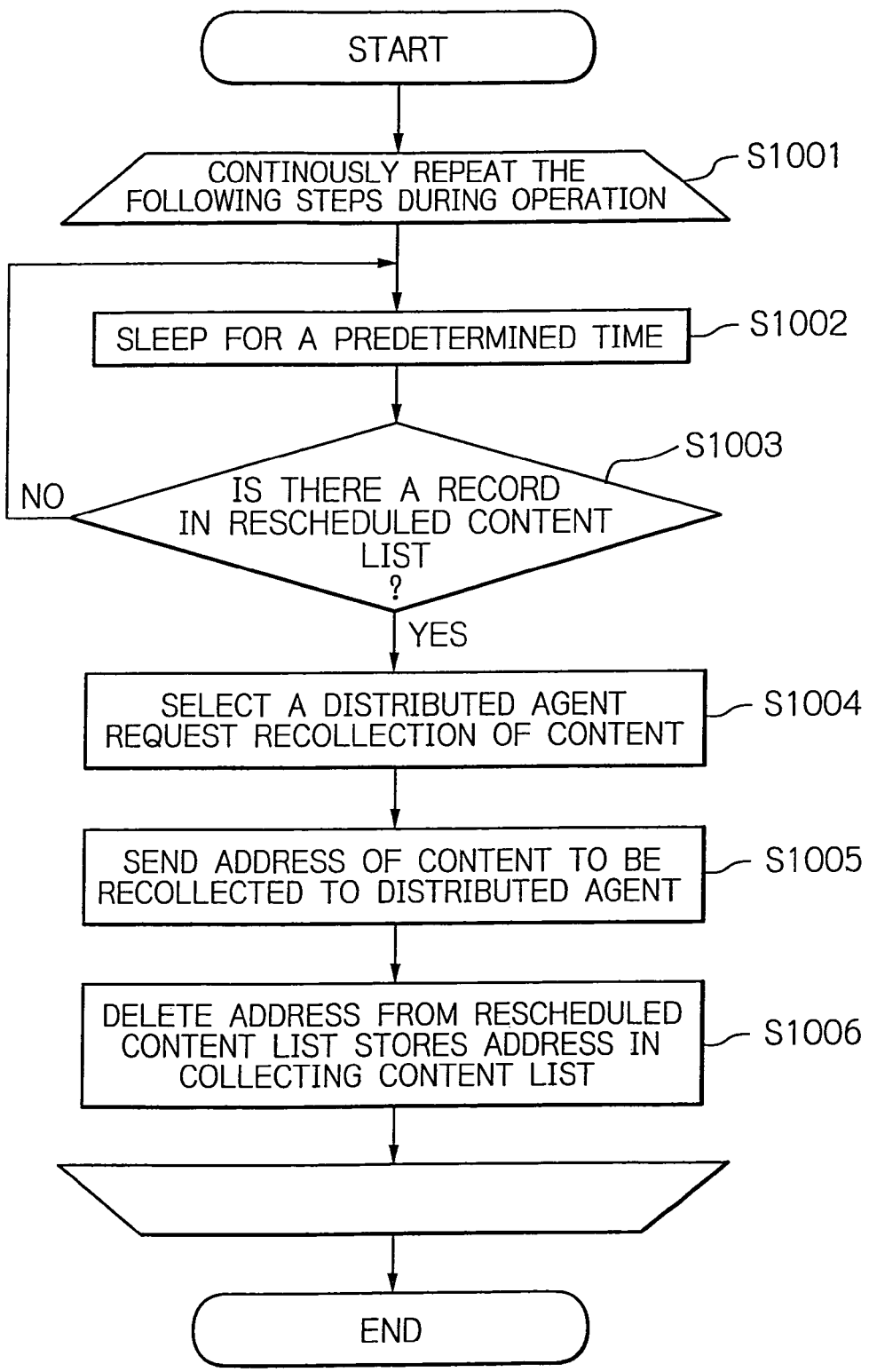
FIG. 10 is a flow chart useful for understanding the operation of a recollection request subsection provided in the crawling terminal in accordance with the alternative embodiment.

FIG. 10 is a flow chart for use in describing the operation of the recollection request subsection 118 provided in the crawling terminal 110. In the following, the respective steps of the process will be described.

In step S1001, the recollection request subsection 118 repeats the following steps S1002 to S1006 as long as the crawling terminal 110 is operating.

In step S1002, the recollection request subsection 118 sleeps for a predetermined time.

In step S1003, the recollection request subsection 118 determines whether or not there is a record in the rescheduled content list 113. If there is a record in the rescheduled content list 113, the process proceeds to step S1004, or otherwise returns to step S1002.

In step S1004, the recollection request subsection 118 selects a distributed agent to request recollection of the content recorded in the rescheduled content list 113. An appropriate distributed agent is selected in this step, for example, by making use of a routing protocol such as BGP (Border Gateway Protocol) and selecting the distributed agent which is closest to the content server 120 in terms of network distance. Several methods are applicable to calculating the network distance. For example, the network distance can be easily calculated by counting the number of hops.

In step S1005, the recollection request subsection 118 of the crawling terminal 110 sends the address of a content stored or recorded in the rescheduled content list 113 to the distributed agent which is selected in step S1004.

In step S1006, the recollection request subsection 118 deletes the address which is sent to the distributed agent from the rescheduled content list 113, and stores this address in the collecting content list 112.

As has been discussed above, even if the crawling terminal 110 fails to collect some content, it may be possible to collect this content by requesting the distributed agent which is closest to the content server 120 in terms of network distance to collect the content which the crawling terminal 110 failed to collect. The collection of content can therefore be performed in an effective manner.

Figure 11:
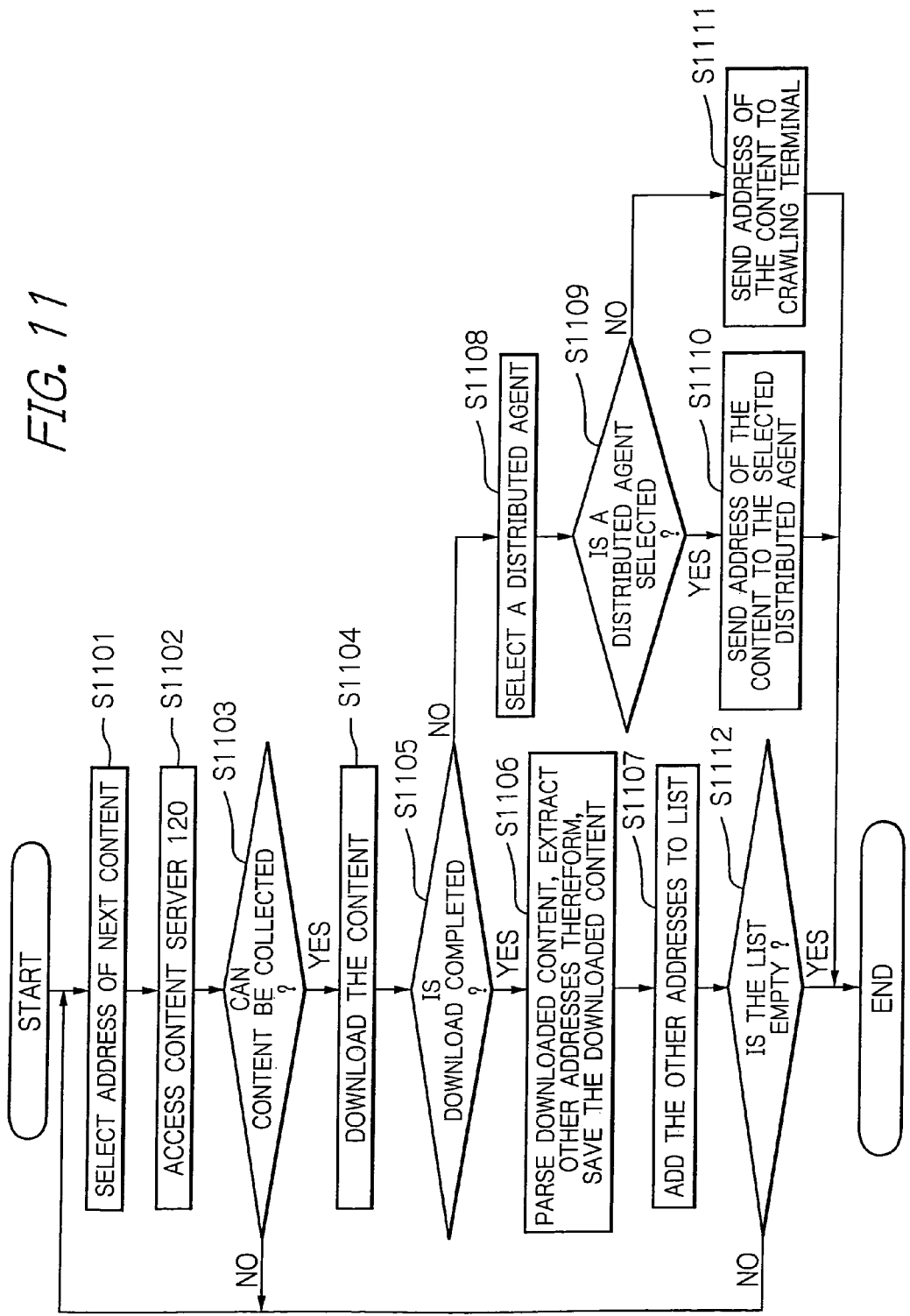
FIG. 11 is a flow chart useful for understanding the operation of the distributed agent in accordance with the alternative embodiment.

FIG. 11 is a flow chart for use in describing the operation of the distributed agent 150a. When receiving the address which is sent from the crawling terminal 110 in step S1005 as described above, the request receiving subsection 159 of the distributed agent 150a adds this address to the scheduled content list 151. This process is performed in an asynchronous fashion with the steps of the control flow shown in FIG. 11. In the following, the steps of the process will be described.

In step S1101, the request subsection 154 and the connection establishing subsection 155 establishes a connection with the content server 120 in the same manner as described above for the embodiment with reference to FIG. 5.

The collection subsection 156 selects the address of the content to be collected with reference to the scheduled content list 151. The address as selected is then deleted from the scheduled content list 151 and added to the collecting content list 152.

Steps S1102 to S1107 are equivalent to steps S702 to S707, respectively, shown in FIG. 7, and therefore no redundant description is repeated.

In step S1108, the recollection request subsection 158 selects another distributed agent to be requested to recollect content in the same manner as the recollection request subsection 118 of the crawling terminal 110.

In step S1109, the process proceeds to step S1110 if another distributed agent can be selected in step S1108, otherwise proceeds to step S1111.

In step S1110, the recollection request subsection 158 sends the address of a content which could not be collected to another distributed agent selected in step S1108. At this time, the recollection request subsection 158 also sends the information that the distributed agent 150a itself failed to collect the content.

Each distributed agent is provided with a failure list which is stored in a storage unit for temporarily saving information on the distributed agents which failed to collect content. The address of a content and the distributed agent which failed to collect this content are associated in this failure list.

Each distributed agent selects another distributed agent in step S1108 from among distributed agents which are not saved in the failure list. Specifically, when selecting another distributed agent, each distributed agent selects a distributed agent which is not recorded in the failure list and is closest to the content server 120 except for the distributed agents recorded in the failure list.

In step S1111, the recollection request subsection 158 sends the information about the addresses of content items which are not collected to the crawling terminal 110.

When a distributed agent having successfully collected content, the collection subsection 156 of this distributed agent sends the content as collected to the crawling terminal 110 together with the address thereof. The recollection request subsection 118 of the crawling terminal 110 receives and saves the content and removes the address thereof from the collecting content list 112.

If all the distributed agents failed to collect a certain content item or if a certain distributed agent failed to collect a certain content item and then failed to select the next distributed agent in step S1111, then the recollection request subsection 118 of the crawling terminal 110 deletes the address of those certain content items from the collecting content list 112 and stores this address in the scheduled content list 111.

In the above, the recollection request subsection 118 is formed as part of the crawling terminal 110. However, the recollection request subsection 118 can be implemented as a separate unit.

As has been discussed above, the distributed agents are provided in accordance with the alternative embodiment, and thereby there is an advantage that the content which is not completely collected and stored in the rescheduled content list 113 is collected by a distributed agent which is located in another position of the network. The collection efficiency can therefore be increased.

In the alternative embodiment described above, when the crawling terminal 110 requests a distributed agent to recollect content or when the distributed agent 150a requests another distributed agent to recollect content, the crawling terminal 110 or the distributed agent 150a selects the distributed agent closest to the content server 120 as a distributed agent to be requested to recollect content. Another alternative embodiment will be described which is adapted for selecting a distributed agent when requesting recollection of content.

The crawling terminal 110 and the respective distributed agents exchange and share information about the possibilities of successfully accessing the content server 120 from the crawling terminal 110 and the respective distributed agents. This information is saved in the crawling terminal 110 and the respective distributed agents and used in order to select a distributed agent having the highest possibility as a distributed agent to be requested to recollect content.

By this process, the possibility of successfully recollecting content is expected to increase, and thereby the collection of content can be performed in a more efficient manner.

It is possible to share the possibilities of successfully accessing the content server 120 from the crawling terminal 110 and the respective distributed agents by exchanging information through the network 100 among the crawling terminal 110 and the distributed agents at an arbitrary timing, or by counting the number of times of receiving a recollection request at each of the distributed agents and crawling terminal from another of the distributed agents and crawling terminal, accumulating the results of counting, and calculating the possibilities on the basis of the statistics on the results.

In software implementations of the present invention, computer software and/or data is stored on one or more machine readable media as part of a computer program product, and is loaded into or written on a computer system or other device or machine, serving as any of the above servers and the terminals via a removable storage drive, hard drive, or communications interface.

While the present invention has been described with reference to the particular illustrative embodiments, it is not to be restricted by the embodiments. It is to be appreciated that those skilled in the art can change or modify the embodiments without departing from the scope and spirit of the present invention.

For example, while the session control server 130 serves as an intermediary to establish a connection between the crawling terminal 110 or a distributed agent and the content server 120 in accordance with the above embodiments, the present invention is not limited thereto.

More specifically, even without the session control server, it is possible to relieve network congestion in the environment where there are a bandwidth admission control server, a plurality of web crawlers which collect contents while reducing the load due to crawling on the network in cooperation with the bandwidth admission control server, and a number of content servers which desire to maintain the quality of service by avoiding traffic congestion, as described below.

First, each content server is informed of the address of the bandwidth admission control server in advance. When connecting with a content server, each crawler registers its connection with the content server in an appropriate connection table provided in the bandwidth admission control server in which each crawler and the content server connected thereto are associated with each other. The crawler can perform the registration by sending a registration request to the bandwidth admission control server just after this crawler establishes a connection with the content server. When the traffic on a content server becomes heavier, or too heavy, this content server asks the bandwidth admission control server to reduce the traffic. The bandwidth admission control server then instructs an appropriate crawler to disconnect the connection. Finally, the crawler disconnects the connection to reduce the traffic in response to the instruction.

The entire disclosure of Japanese patent application No. 2007-149079 filed on Jun. 5, 2007, including the specification, claims, accompanying drawings and abstract of the disclosure, is incorporated herein by reference in its entirety.

What is claimed is:

1. A method of controlling a network bandwidth used by a communication terminal, comprising:

a connection request sending step of sending a connection request for connection with a destination from the communication terminal, the connection request including information that, when there is a shortage of network bandwidth, the connection between the communication terminal and the destination can be disconnected by priority;

a connection request receiving step of receiving the connection request between the communication terminal and the destination by a network bandwidth control system;

a connection establishing step of establishing a connection between the communication terminal and the destination by the network bandwidth control system; and a disconnecting step of disconnecting the connection between the communication terminal and the destination by the network bandwidth control system when there is a shortage of network bandwidth.

2. The method in accordance with claim 1, further comprising:

an information storing step of storing information for identifying the communication terminal and indicating the network bandwidth used by the communication terminal in a storage unit; and a determining step of determining whether or not the connection between the communication terminal and the destination can be disconnected with reference to the network bandwidth stored in said information storing step when there is a shortage of network bandwidth, said disconnecting step disconnecting the connection between the communication terminal and the destination by the network bandwidth control system if it is determined in said determining step that the connection between the communication terminal and the destination can be disconnected.

3. A method of crawling by a crawling device to collect content over a telecommunications network, comprising:

a requesting step of sending a connection request for establishing a connection between the crawling device and a server serving as a content provider;

an establishing step of establishing a connection between the crawling device and the server; and a collecting step of collecting content provided by the server, the connection request sent in said requesting step including information that, when there is a shortage of network bandwidth, the connection between the crawling device and the server can be disconnected by priority, if the connection between the crawling device and the server is disconnected during collecting content in said collecting step, the location of the content being recorded in a list, all of said steps being performed again at a later time for collecting the content with reference to the list.

4. The method in accordance with claim 3, wherein one or more agents are provided on the network, said method further comprising:

a requesting step of sending a content collection request to one of the agents from the crawling device to collect the content recorded in the list;

a deleting step of deleting a record of the content from the list after requesting one of the agents to collect the content; and a result receiving step of receiving a result of collecting the content from the one of the agents by the crawling device, if the crawling device receives the result indicating that the one agent failed to collect the content, the location of the content being recorded again in the list.

5. The method in accordance with claim 4, wherein, in said requesting step, the crawling device requests one of the agents, which is closest to the server in terms of network distance, to collect the content.

6. The method in accordance with claim 4, wherein a possibility of successfully accessing the server is recorded for each of the agents, and the crawling device requests one of the agents having the highest possibility to collect the content.

7. A method of crawling by a plurality of agent devices to collect content over a telecommunications network, comprising:

a collection request sending step of sending a collection request to one of the agent devices to collect content;

a requesting step of sending a connection request for establishing a connection between the one agent device and a server serving as a content provider;

an establishing step of establishing a connection between the one agent device and the server; and a collecting step of collecting content from the server by the one agent device, the connection request sent in said requesting step including information that, when there is a shortage of network bandwidth, the connection between one of the agent devices and the server can be disconnected by priority, if the connection between one of the agent devices and the server is disconnected during collecting content in said collecting step, a collection request being set to another of the agent devices to collect the content.

8. The method in accordance with claim 7, further comprising:

an information storing step of storing, in a failure list, information for identifying the agent devices that failed to collect content, the collection request being sent to one of the agent devices which is not recorded in the failure list.

9. The method in accordance with claim 8, wherein the collection request is sent to one of the agent devices which is closest to the server in terms of network distance and which is not recorded in the failure list.

10. The method in accordance with claim 8, wherein a possibility of successfully accessing the server is recorded for each of the agent devices, and the collection request is sent to the agent device having the highest possibility among the agent devices which are not recorded in the failure list.

11. The method in accordance with claim 7, wherein, when all the agent devices failed to collect content, a message indicative of all the agent devices having failed to collect content is returned.

12. A nontransitory program storage medium for storing a computer-readable program, the program causing a computer to implement a method of controlling a network bandwidth used by a communication terminal, comprising:

a connection request sending step of sending a connection request for connection with a destination from the communication terminal, the connection request including information that, when there is a shortage of network bandwidth, the connection between the communication terminal and the destination can be disconnected by priority;

a connection request receiving step of receiving the connection request between the communication terminal and the destination by a network bandwidth control system;

a connection establishing step of establishing a connection between the communication terminal and the destination by the network bandwidth control system; and a disconnecting step of disconnecting the connection between the communication terminal and the destination by the network bandwidth control system when there is a shortage of network bandwidth.

13. A nontransitory program storage medium for storing a computer-readable program, the program causing a computer to implement a method of crawling by a crawling device to collect content over a telecommunications network, comprising:

a requesting step of sending a connection request for establishing a connection between the crawling device and a server serving as a content provider;

an establishing step of establishing a connection between the crawling device and the server; and a collecting step of collecting content provided by the server, the connection request sent in said requesting step including information that, when there is a shortage of network bandwidth, the connection between the crawling device and the server can be disconnected by priority, if the connection between the crawling device and the server is disconnected during collecting content in said collecting step, the location of the content being recorded in a list, all of said steps being performed again at a later time for collecting the content with reference to the list.

14. A nontransitory program storage medium for storing a computer-readable program, the program causing a computer to implement a method of crawling by a plurality of agent devices to collect content over a telecommunications network, comprising:

a collection request sending step of sending a collection request to one of the agent devices to collect content;

a requesting step of sending a connection request for establishing a connection between the one agent device and a server serving as a content provider;

an establishing step of establishing a connection between the one agent device and the server; and a collecting step of collecting content from the server by the one agent device, the connection request sent in said requesting step including information that, when there is a shortage of network bandwidth, the connection between one of the agent devices and the server can be disconnected by priority, if the connection between one of the agent devices and the server is disconnected during collecting content in said collecting step, a collection request being sent to another of the agent devices to collect the content.

15. A network bandwidth control system for controlling a network bandwidth used by a communication terminal, comprising:
a connection request receiving circuit operable to receive a connection request between the communication terminal and a destination together with information that, when there is a shortage of network bandwidth, the connection between the communication terminal and the destination can be disconnected by priority;
a connection establishing circuit operable to establish a connection between the communication terminal and the destination; and
a disconnecting circuit operable to disconnect the connection between the communication terminal and the destination,
said disconnecting circuit disconnecting the connection between the communication terminal and the destination when there is a shortage of network bandwidth.

16. The system in accordance with claim 15, further comprising:
a storage circuit for storing information for identifying the communication terminal and indicating the network bandwidth used by the communication terminal; and
a determining circuit operable to determine, when there is a shortage of network bandwidth, whether or not the shortage of network bandwidth can be solved by disconnecting the connection between the communication terminal and the destination with reference to the network bandwidth stored in the storage circuit, and disconnect the connection if it is determined that the shortage of network bandwidth can be solved by disconnecting the connection.

17. A crawling device for collecting content over a telecommunications network, comprising:
a requesting circuit operable to send a connection request for establishing a connection between the crawling device and a server serving as a content provider;
an establishing circuit operable to establish a connection between the crawling device and the server; and
a collecting circuit operable to collect content provided by the server,
said requesting circuit sending the connection request together with information that, when there is a shortage of network bandwidth, the connection between the crawling device and the server can be disconnected by priority,
if the connection between the crawling device and the server is disconnected during collecting content, the location of the content being recorded in a list, the list being referenced at a later time for collecting the content.

18. The crawling device in accordance with claim 17, further comprising:
a requesting circuit operable to send a content collection request to one of agents, which are capable of collecting content over the network, to collect the content recorded in the list;
a deleting circuit operable to delete a record of the content from the list after requesting one of the agents to collect the content; and
a result receiving circuit of receiving a result of collecting the content from the one of the agents,
if said crawling device receives the result indicating that the one agent failed to collect the content, the location of the content is recorded again in the list.

19. The crawling device in accordance with claim 18, wherein said crawling device requests one of the agents, which is closest to the server in terms of network distance, to collect the content.

20. The crawling device in accordance with claim 18, wherein a possibility of successfully accessing the server is recorded for each of the agents, and said crawling device requests one of the agents having the highest possibility to collect the content.

21. An agent device for collecting content over telecommunications network, comprising:
a collection request receiving circuit operable to receive a collection request to collect content;
a requesting circuit of sending a connection request for establishing a connection between the agent device and a server serving as a content provider together with information that, when there is a shortage of network bandwidth, the connection between the agent device and the server can be disconnected by priority;
an establishing circuit of establishing a connection between the agent device and the server;
a collecting circuit of collecting content from the server;
a requesting circuit operable to send a content collection request to another agent device to collect content; and
a disconnecting circuit operable to disconnect the connection between the communication terminal and the destination when there is a shortage of network bandwidth,
said requesting circuit sending, if the connection between one of the agent devices and the server is disconnected during collecting content in said collecting circuit, a content collection request to another agent device to collect the content.

22. The agent device in accordance with claim 21, further comprising an information storing circuit operable to storing, in a failure list, information for identifying agent devices and failed to collect content,
said requesting circuit sending a content collection request to one of the agent devices which is not recorded in the failure list.

23. The agent device in accordance with claim 22, wherein said requesting circuit sends a content collection request to one of the agent devices which is not recorded in the failure list and which is closest to the server in terms of network distance.

24. The agent device in accordance with claim 22, wherein a possibility of successfully accessing the server is recorded for each of the agent devices, and said requesting circuit sends a content collection request to one of the agent devices having the highest possibility.

25. The agent device in accordance with claim 24, wherein, when all of the agent devices failed to collect content, a message indicative of all of the agent devices having failed to collect content is sent to a client having sent the collection request to the agent device.

26. A telecommunications network system comprising a network bandwidth control system, a crawling device, a plurality of agent devices, and a plurality of content servers, which are connected over a telecommunications network,
said network bandwidth control system being provided for controlling the network bandwidth used by said crawling device, and comprising:
a connection request receiving circuit operable to receive, from said crawling device, a connection request between said crawling device and one of said content servers together with information that, when there is a shortage of network bandwidth, the connection between said crawling device and said one content server can be disconnected by priority;
a connection establishing circuit operable to establish a connection between said crawling device and said one content server; and
a disconnecting circuit operable to disconnect the connection between said crawling device and said one server,
said disconnecting circuit disconnecting the connection between said crawling device and said one server when there is a shortage of network bandwidth,
said crawling device being provided for collecting content over the network, comprising:
a requesting circuit operable to send a connection request to said network bandwidth control system for establishing a connection between said crawling device and one of said content servers;
an establishing circuit operable to establish a connection between said crawling device and said one server; and
a collecting circuit operable to collect content provided by said one server,
said requesting circuit sending the connection request together with information that, when there is a shortage of network bandwidth, the connection between said crawling device and said one server can be disconnected by priority,
if the connection between said crawling device and said one server is disconnected during collecting content, the location of the content being recorded in a list provided in said network bandwidth control system, the list being referenced at a later time for collecting the content,
said agent device being provided for collecting content over the network, comprising:
a collection request receiving circuit operable to receive a collection request from said crawling device to collect content;
a requesting circuit of sending a connection request to said network bandwidth control system for connection establishment between said agent device and one of said content servers together with information that, when there is a shortage of network bandwidth, the connection between said agent device and said one server can be disconnected by priority;
an establishing circuit of establishing a connection between said agent device and said one server;
a collecting circuit of collecting content from said one server;
a requesting circuit operable to send a content collection request to another agent device to collect content; and
a disconnecting circuit operable to disconnect the connection between said crawling device and said one server when there is a shortage of network bandwidth,
if the connection between one of said agent devices and said one server is disconnected during collecting content by said collecting circuit, said requesting circuit sending a content collection request to another agent device to collect the content.

\* \* \* \* \*

UNITED STATES PATENT AND TRADEMARK OFFICE
CERTIFICATE OF CORRECTION

PATENT NO. : 7,877,479 B2
APPLICATION NO. : 12/155430
DATED : January 25, 2011
INVENTOR(S) : Satoshi Ikada et al.

It is certified that error appears in the above-identified patent and that said Letters Patent is hereby corrected as shown below:

Title Page, Item 75 (Inventors)

"Satoshi Ikada, Tokyo, (JP)" should be changed to --Satoshi Ikada, Nara, (JP)--
"Yoshitaka Hamaguchi, Tokyo, (JP)" should be changed to --Yoshitaka Hamaguchi, Nara, (JP)--

Signed and Sealed this
Thirty-first Day of May, 2011

David J. Kappos
*Director of the United States Patent and Trademark Office*